3,512,929
FLOWABLE AMMONIUM THIOSULFATE AND METHOD FOR ITS MANUFACTURE

Ernst Mack, Mannheim-Rheinau, Germany, assignor to Th. Goldschmidt A.G., Essen, Germany
No Drawing. Filed Jan. 3, 1967, Ser. No. 606,566
Claims priority, application Germany, Feb. 1, 1966, G 45,882
Int. Cl. C01b 17/64
U.S. Cl. 23—115    5 Claims

ABSTRACT OF THE DISCLOSURE

The invention discloses a procedure for preventing ammonium thiosulfate from caking. For this purpose, dry crystalline ammonium thiosulfate is admixed with minor amounts, to wit, up to 2 percent by weight, of sodium thiosulfate. It has been found that such a mixture, if stored under the exclusion of moisture, can be retained in freely flowable condition for long periods of time.

BRIEF SUMMARY OF THE INVENTION

This invention relates to crystalline ammonium thiosulfate and is particularly directed to a procedure for maintaining ammonium thiosulfate in fluid condition. The term "fluid" as used herein refers to a condition in which the ammonium thiosulfate crystal mass can be poured and is freely flowable as contrasted to agglomerated or caked ammonium thiosulfate.

As is well known, ammonium thiosulfate has a very pronounced tendency to agglomerate and caking, a phenomenon which also is known from other ammonium salts as, for example, ammonium nitrate. This tendency to caking renders the handling of crystalline ammonium thiosulfate extremely difficult. Furthermore, at room temperature ammonium thiosulfate, due to its hygroscopic characteristics, tends to deliquesce at a relative air humidity of about 60%.

The characteristic of the salt to cake and agglomerate during shipping and storage is, of course, highly undesired and results in additional costs, because, prior to use, the caked salt has to be mechanically crushed or comminuted in order to transform it into a state in which it can be measured and handled.

The pronounced tendency of ammonium thiosulfate to form lumps and cakes has seriously reduced the fields of utilization for which otherwise substantially pure ammonium thiosulfate, to wit, ammonium thiosulfate of a purity of about 98 to 100% would be employed. As a matter of fact, the caking characteristic of ammonium thiosulfate is so grave that, except when it is used at the location where the salt is manufactured, from a practical point of view it is only employed for the preparation of liquid fixing mixtures for photographic purposes. However, a freely flowing stable ammonium thiosulfate would be most suitable and desired and of great commercial interest for the production of solid so-called "rapid fix" salt mixtures away from the plant where the ammonium salt is manufactured, provided the salt retains its fluid characteristics so that it can be measured and dosed in mechanical manner.

Accordingly, it is a primary object of this invention to maintain crystalline ammonium thiosulfate in fluid condition.

Briefly, and in accordance with this invention, it has been ascertained that the fluid condition of ammonium thiosulfate is retained and caking prevented by admixing the salt with anhydrous sodium thiosulfate in powder form. It has been found that the best results are obtained if the amount of sodium thiosulfate added to the ammonium thiosulfate is between about 0.1 and 2% by weight. The preferred range is about 0.5 to 0.8% by weight. These quantities are sufficient, effectively to prevent the caking of the ammonium thiosulfate and to retain it in a fluid condition for several months. The particular advantage of the addition of anhydrous sodium thiosulfate resides in the fact that although this salt acts as an anti-caking agent, it is at the same time a closely related compound which has pronounced affinity to ammonium thiosulfate so that for practical purposes no extraneous material is introduced. As a matter of fact, if the ammonium thiosulfate is to be used for rapid fixing salt mixtures, sodium thiosulfate in appreciable amounts is normally added to such mixtures in any event, so that the prior admixture of the sodium salt to the ammonium salt has no detrimental effect whatsoever but serves a twin purpose, to wit, to retain the ammonium salt in its fluid condition and to premix the salt with an additive which is in any event necessary for the ultimate use of the ammonium salt.

It will be appreciated that ammonium thiosulfate in fluid condition can, of course, be handled much more easily than the caked salt. Further, the production of solid rapid fix salt mixtures for photographic purposes is customarily carried out at a different location than the location where the ammonium salt is manufactured. Since in accordance with this invention the ammonium salt retains its fluid condition, the salt can be conveyed into suitable measuring and dosage equipment for dispensing the proper amount, a procedure which was not possible prior to the invention due to the caking tendency of the salt.

The photographic properties of the inventive mixture of ammonium thiosulfate and sodium thiosulfate, to wit, its properties in respect to fixing, clarifying, etc., are identical to those of pure ammonium thiosulfate.

The anhydrous sodium thiosulfate has a stabilizing influence on the ammonium thiosulfate. This is due to the fact that the sodium salt removes from the ammonium thiosulfate the last traces of water which have not been removed during the drying of the ammonium salt. It is known that decomposition, to wit, the separation of sulphur, is more pronounced in the moist ammonium thiosulfate than in the dried salt. The stabilizing effect exerted by the sodium salt is of importance because ammonium thiosulfate which is used for the production of solid rapid fixing salt mixtures should be as free as possible from decomposition products such as elementary sulphur.

The concentration of the sodium thiosulfate in the final mixture is to a certain extent dependent on the extent of drying to which the ammonium thiosulfate has been subjected. At water contents of about $\leq 0.1\%$ by weight, it has been found that additions of anhydrous sodium thiosulfate of about $\leq 0.5\%$ by weight are sufficient to obtain the desired result. The grain or particle size of the ammonium thiosulfate crystals and the anhydrous sodium thiosulfate powder is also a factor to be considered in determining the desired concentration of the sodium salt in the mixture. It has been found that the sodium salt addition is the more effective the larger the grains or particles of the ammonium thiosulfate and the finer the sodium thiosulfate particles. This means that if the ammonium thiosulfate is fine grained, relatively greater additions of sodium thiosulfate should be used than in respect to large grained ammonium thiosulfate. Generally, however, the indicated range of the sodium salt concentration has proved to yield excellent results.

For the purpose of shipping and storing the ammonium thiosulfate/sodium thiosulfate mixture and to retain it in fluid condition, packing materials which are substantially impervious to water vapor are the most suitable.

Such packing materials exclude the detrimental influence of air moisture during prolonged storage periods. In this manner, the fluid condition of the salt mixture can be maintained for extremely long periods.

The invention will now be described by a specific example, it being understood, however, that this example is given by way of illustration and not by way of limitation and that changes may be effected without affecting in any way the scope and spirit of the invention as recited in the appended claims.

EXAMPLE I

This experiment was carried out with 20 kg. of dried crystalline ammonium thiosulfate. 100 g. of dry sodium thiosulfate, as available on the market, were added to the 20 kg. of the ammonium salt and the mixture thus obtained was mixed for 15 minutes in a rolling barrel. The ammonium thiosulfate had a water content of 0.1% by weight. The grain spectrum was as follows:

| Percent: | Mm. |
|---|---|
| 3.8 | >1.0 |
| 56.9 | 0.5–1.0 |
| 37.3 | 0.1–0.5 |
| 2.0 | <0.1 |

The mixture thus obtained was in completely fluid or pourable condition and was packed in a sack of a material substantially impervious to water vapor. The sack was stored for three months under a pressure of 0.14 kg. per cm.$^2$ in a temperature range of 5–20° C. and at a relative air humidity of >50%. After three months, the sack was opened and it was ascertained that the salt mixture was still in completely fluid condition.

For control purposes, 20 kg. of the same ammonium thiosulfate were stored in the same manner in a sack of the same material, however, without the addition of the anhydrous sodium thiosulfate. Already after three days, lumps were formed in the sack, and after three months the contents of the sack formed one solid cake.

While a specific embodiment of the invention has been described in detail to illustrate the application of the inventive principles, it will be understood that the invention may be embodied otherwise without departing from such principles.

What is claimed is:
1. As an article of manufacture, a mixture essentially consisting of dry crystalline ammonium thiosulfate and between about 0.1 to 2.0% by weight of anhydrous sodium thiosulfate powder.
2. The mixture of claim 1, wherein the amount of sodium thiosulfate in the mixture is about between 0.5 to 0.8% by weight.
3. A method of retaining ammonium thiosulfate in fluid condition, which comprises mixing dry crystalline ammonium thiosulfate with about between 0.1 to 2.0% by weight of dry sodium thiosulfate in powder form.
4. A method as claimed in claim 3, wherein the ammonium thiosulfate is mixed with about between 0.5 to 0.8% by weight of sodium thiosulfate.
5. A method as claimed in claim 3, wherein the mixture is stored in a packing material substantially impervious to water vapor.

References Cited

UNITED STATES PATENTS 2,475,616  7/1949  Ingraham _____ 23—115 X

EARL C. THOMAS, Primary Examiner

U.S. Cl. X.R.

96—61; 252—385